United States Patent
Monnier et al.

(10) Patent No.: US 11,057,311 B2
(45) Date of Patent: Jul. 6, 2021

(54) ELECTRONIC DEVICE AND METHOD FOR RECEIVING DATA VIA AN ASYNCHRONOUS COMMUNICATION NETWORK, RELATED COMMUNICATION SYSTEM AND COMPUTER PROGRAM

(71) Applicant: THALES, Courbevoie (FR)

(72) Inventors: Stéphane Monnier, Merignac (FR); Patrice Capircio, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/785,285

(22) Filed: Feb. 7, 2020

(65) Prior Publication Data
US 2020/0267087 A1 Aug. 20, 2020

(30) Foreign Application Priority Data
Feb. 15, 2019 (FR) ...................................... 19 01557

(51) Int. Cl.
*H04L 12/841* (2013.01)
*H04L 12/46* (2006.01)
(Continued)

(52) U.S. Cl.
CPC ........ *H04L 47/283* (2013.01); *H04L 12/4641* (2013.01); *H04L 12/5601* (2013.01); *H04L 43/087* (2013.01); *H04L 2012/5649* (2013.01)

(58) Field of Classification Search
CPC ............... H04L 47/283; H04L 12/4641; H04L 12/5601; H04L 43/087; H04L 2012/5649; H04L 47/28
See application file for complete search history.

(56) References Cited

U.S. PATENT DOCUMENTS

2003/0076780 A1\* 4/2003 Loge .................. H04Q 11/0478
370/229
2004/0073690 A1\* 4/2004 Hepworth ............. H04L 47/745
709/230
(Continued)

FOREIGN PATENT DOCUMENTS

FR 2864393 A1 6/2005
FR 2920623 A1 3/2009

OTHER PUBLICATIONS

French Search Report issued by the the French Patent Office in corresponding French Patent Application No. 1901557, dated Nov. 29, 2019.

*Primary Examiner* — Kibrom T Hailu
(74) *Attorney, Agent, or Firm* — Arent Fox LLP (57) ABSTRACT

This electronic device for receiving data via an asynchronous communication network including at least one elementary network, is configured to be connected to said elementary network and comprises:
  a receiving module configured to receive several successive data frames via the asynchronous communication network, each frame being sent over the elementary network according to a predefined sending table and with a minimum time gap between the sending time instants of two successive frames,
  a verification module configured, for at least two received data frames, to estimate a network jitter from the minimum time gap and reception time instants of at least two frames received on said elementary network, then to compare the estimated jitter to an authorized range of network jitter values.

20 Claims, 4 Drawing Sheets

(51) Int. Cl.
*H04L 12/54* (2013.01)
*H04L 12/26* (2006.01)
*H04L 12/70* (2013.01)

(56) References Cited

U.S. PATENT DOCUMENTS

| | | | |
|---|---|---|---|
| 2004/0225916 A1* | 11/2004 | Clark | H04L 41/065 |
| | | | 714/25 |
| 2008/0219163 A1* | 9/2008 | Saint Etienne | H04L 43/00 |
| | | | 370/235 |
| 2010/0284313 A1* | 11/2010 | Monnier | H04L 49/351 |
| | | | 370/294 |
| 2014/0135068 A1* | 5/2014 | Anandakumar | G10L 19/04 |
| | | | 455/563 |
| 2015/0103734 A1 | 4/2015 | Bobrek | |
| 2017/0171112 A1* | 6/2017 | Saint-Etienne | H04L 12/4625 |
| 2018/0337938 A1 | 11/2018 | Kneib et al. | |
| 2019/0389599 A1* | 12/2019 | Dillard | B64D 45/00 |

* cited by examiner

ELECTRONIC DEVICE AND METHOD FOR RECEIVING DATA VIA AN ASYNCHRONOUS COMMUNICATION NETWORK, RELATED COMMUNICATION SYSTEM AND COMPUTER PROGRAM

CROSS-REFERENCE TO RELATED APPLICATIONS

This application is a U.S. non-provisional application claiming the benefit of French Application No. 19 01557, filed on Feb. 15, 2019, which is incorporated herein by reference in its entirety.

FIELD

The present invention relates to an electronic receiving device for receiving data via an asynchronous communication network including at least one elementary network, the electronic device being configured to be connected to said elementary network.

The invention also relates to an electronic data communication system including an electronic sending device and such an electronic receiving device, connected to one another by an asynchronous communication network, the communication network including at least one elementary network.

The invention also relates to a receiving method for receiving data via an asynchronous communication network including at least one elementary network, the method being carried out by an electronic receiving device connected to said elementary network.

The invention also relates to a non-transitory computer-readable medium including a computer program including software instructions which, when executed by a computer, implement such a receiving method.

The invention relates to the field of systems communicating with asynchronous communication networks, for example Ethernet communication networks, in particular avionics communication systems on board aircraft, such as avionics communication systems according to part 7 of standard ARINC 664.

BACKGROUND

Known from document FR 2 864 393 B1 is an asynchronous communication network of the Ethernet full-duplex switched type, and a surveillance method for such a network, in particular in the avionics field.

The communication network comprises two independent elementary networks each including at least one source equipment item and at least one receiving equipment item connected to one another by at least one physical link through at least one switch. Each equipment item is connected to each elementary network, and each frame sent by a source equipment item over a virtual link over an independent elementary network comprises a number included in a predetermined interval.

In reception by an equipment item receiving a frame over a virtual link at a given time instant, the surveillance method comprises, for managing a redundancy between elementary networks, the definition, for this virtual link, of a window included in said predetermined interval, corresponding to frames already received at that given time instant; comparing the number of the received frame with said window, and taking the received frame into account when the frame number is not included in said window.

However, such an asynchronous communication network and such a surveillance method are not very robust in terms of cybersecurity and are in particular sensitive to a potential cyber-attack.

SUMMARY

The aim of the invention is then to propose an electronic device and a method for receiving data via an asynchronous redundant communication network, which make it possible to improve the surveillance of the network, and in particular to detect a cyberattack more effectively.

To that end, the invention relates to an electronic receiving device for receiving data via an asynchronous communication network including at least one elementary network, the electronic device being configured to be connected to said elementary network and comprising:
- a receiving module configured to receive several successive data frames via the asynchronous communication network, each frame being sent over the elementary network according to a predefined sending table and with a minimum time gap between sending time instants of two successive frames,
- a verification module configured, for at least two received data frames, to estimate a network jitter from the minimum time gap and reception time instants of at least two frames received on said elementary network, then to compare the estimated jitter to an authorized range of network jitter values.

The electronic receiving device according to the invention then makes it possible to improve the surveillance of the asynchronous network by estimating the jitter of the network from the minimum time gap and the reception time instants of the frames, then comparing the estimated jitter to the authorized range of network jitter values. Indeed, watching the network jitter and detecting an abnormal jitter value makes it easier to detect a replacement of an equipment item connected to the network with malicious equipment, a replacement of a network switch with a malicious switch, as well as an abnormal use of the network for example resulting from a cyber-attack.

According to other advantageous aspects of the invention, the electronic receiving device comprises one or more of the following features, considered alone or according to all technically possible combinations:
- the authorized range of network jitter values is determined through preliminary learning including the sending of predefined sequence(s) of frame(s), preferably the sending of normal sequences corresponding to authorized network jitter values and abnormal sequences corresponding to noncompliant network jitter values;
- the authorized range of network jitter values is determined through a static analysis of the network;
- the authorized range of network jitter values depends on an operating phase in which an aircraft is found on which the electronic receiving device is configured to be embedded;
- the verification module is further configured to compare the estimated jitter for the respective elementary network to the estimated jitter(s) for the other elementary network(s) of a group of elementary network(s), this group of elementary network(s) corresponding to a data transmission path with at least one network switch in common;
- the verification module is configured to estimate the network jitter from the duration separating two reception time instants and from a predefined inter-frame time period, the predefined inter-frame time period being a function of the minimum time gap; the predefined inter-frame time period preferably being equal to the minimum time gap divided by an oversampling factor;

the predefined inter-frame time period preferably being greater than twice the maximum value of the authorized range of network jitter values;

the device is an avionics device according to part 7 of standard ARINC 664, and the receiving module is configured to receive each frame according to a protocol compliant with part 7 of standard ARINC 664; and the verification module is at least partially made in the form of a programmable logic component, such as an FPGA (Field Programmable Gate Array).

The invention also relates to an electronic data communication system including an electronic sending device and an electronic receiving device, connected to one another by an asynchronous communication network, the asynchronous communication network comprising at least one elementary network, the electronic sending device being configured to send, to the electronic receiving device, several successive data frames over said elementary network, and the electronic receiving device being as defined above.

The invention also relates to a receiving method for receiving data via an asynchronous communication network including at least one elementary network, the receiving method being carried out by an electronic receiving device connected to said elementary network, and comprising:

a receiving step for receiving several successive data frames, via the asynchronous communication network, each frame being sent over the elementary network and according to a predefined sending table and with a minimum time gap between the sending time instants of two successive frames, a verification step for verifying at least two received data frames, the verification step including an estimate of a network jitter from the minimum time gap and reception time instants of at least two frames received on said elementary network, then a comparison of the estimated jitter to an authorized range of network jitter values.

The invention also relates to a non-transitory computer-readable medium including a computer program including software instructions which, when executed by a computer, implement a receiving method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

In the rest of the description, the expression "substantially equal to" defines a relationship of equality to within plus or minus 10%, preferably to within plus or minus 5%.

Figure 1:
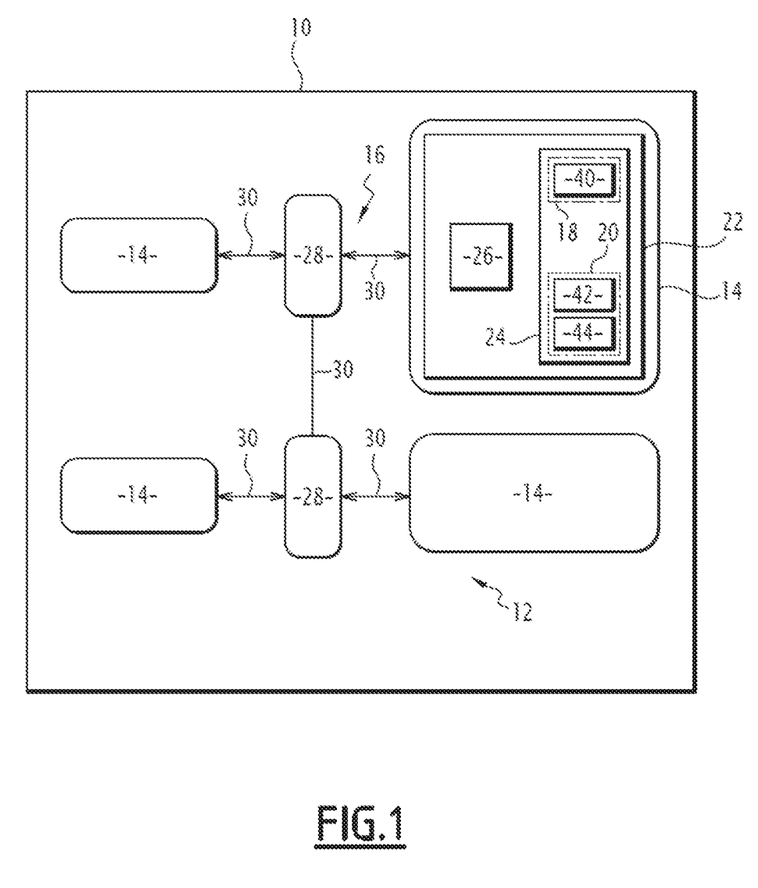
FIG. 1 is a schematic illustration of an aircraft equipped with a communication system according to the invention, including at least two items of avionic equipment connected to one another by an asynchronous communication network.

In FIG. 1, an aircraft 10 includes a communication system 12 comprising at least two electronic equipment items 14 connected to one another by an asynchronous communication network 16, such as a redundant Ethernet communication network.

The aircraft 10 is preferably an airplane. Alternatively, the aircraft 10 is a helicopter, or a drone piloted remotely by a pilot.

The communication system 12 comprises several electronic equipment items 14, such as avionics equipment like in the example of FIG. 1, where the communication system 12 is embedded in the aircraft 10.

The communication system 12 comprises an electronic sending device 18 and an electronic receiving device 20 connected to one another by the asynchronous communication network 16.

In the example of FIG. 1, each electronic equipment item 14 is preferably configured, on the one hand, to send data to the other piece(s) of electronic equipment 14, and on the other hand, to receive data from the other piece(s) of electronic equipment 14. Each electronic equipment item 14 then preferably includes the sending device 18 and the receiving device 20.

One skilled in the art will of course understand that an electronic equipment item 14 that is only intended to send data and not to receive it will then comprise the sending device 18, but not the receiving device. Conversely, an electronic equipment item 14 that is only intended to receive data from other avionic equipment item(s) 14 will then include the receiving device 20, but not the sending device.

Each electronic equipment item 14 is preferably according to part 7 of standard ARINC 664.

In the example of FIG. 1, each electronic equipment item 14 includes an information processing unit 22, for example made up of a memory 24 associated with a processor 26.

In the example of FIG. 1, a single electronic equipment item 14 is shown in detail with the different devices and modules that it contains, in order to simplify the drawing.

The communication network 16 includes at least one network switch 28 and at least one two-way link 30, each network switch 28 being connected to one or several electronic equipment items 14 via respective two-way links 30. The communication network 16 preferably includes several network switches 28, like in the example of FIG. 1, where the communication network 16 includes two network switches 28 connected to one another by a two-way link 30.

One skilled in the art will understand that, when the communication network 16 is an Ethernet communication network, for example of the switched "full-duplex" Ethernet type, each network switch 28 is an Ethernet network switch, for example of the switched "full-duplex" Ethernet type, and each two-way link 30 is a two-way Ethernet link, for example of the switched "full-duplex" Ethernet type.

The communication network 16 preferably conforms to part 7 of standard ARINC 664, and each network switch 28 then also conforms to part 7 of standard ARINC 664. The communication network 16 is for example an AFDX (Avionics Full DupleX switched Ethernet) network with one or several network switch(es) 28 according to part 7 of standard ARINC 664.

The communication network 16 of the switched "full-duplex" Ethernet type, as defined for example in document US 2003/0152077 A1, is based on the switched full-duplex Ethernet standard described by standard IEEE802.3, and offers improved functionalities relative to this standard to allow better reliability in the transmission of information, in particular in the avionics field.

The communication network 16 offers a deterministic transmission time by adding communication services on the Ethernet network. This deterministic aspect uses a virtual link concept, which is a conceptual representation of a connection of a source equipment item 14 to at least one receiving equipment item 14. Such a virtual link concept makes it possible to isolate data transfers between a source equipment item 14 and receiving equipment items 14. A virtual link is seen as a "pipe" on the network 16.

As described by document FR 2 864 393 B1, a virtual link is for example characterized by:
  a transfer direction, the virtual link being a one-way link,
  a single source equipment item 14,
  one or several receiving equipment items 14,
  a frozen bandwidth (maximum number of packets and their maximum size per second),
  a guaranteed maximum transfer time of the packets from a source equipment item 14 to a receiving equipment item 14, irrespective of the behavior of the rest of the network 16, each virtual link having its own transfer time,
  a frozen path on the network 16, and
  a unique identifier.

The switch 28 knows, from a static configuration, virtual links that it must switch as well as the number of packets authorized for a virtual link.

This virtual link concept makes it possible to freeze the communications between the equipment items 14 by configuring the routes and the bandwidth allocated to the virtual links. Thus, the flow formed by a virtual link is guaranteed not to be disrupted by the other flows sharing the same physical links all along its route in the network. Additionally, this virtual link concept makes it possible, through a centralized management of the flows, to guarantee that the sum of the bandwidth allocated to the virtual links on a same physical link does not exceed the capabilities of the technology thereof.

The asynchronous communication network 16 includes at least one elementary network, for example corresponding to a respective virtual link.

The asynchronous communication network 16 is preferably a redundant communication network and comprises at least two independent elementary networks, redundant with respect to one another. In this case, two electronic equipment items 14, a source equipment item and a receiving equipment item, communicate via at least two independent elementary networks. In a known manner, the redundancy is provided frame by frame on each of said networks.

As an example, on a virtual link, the source equipment successively sends information frames 32 to the receiving equipment. Each of said frames 32 is sent, with an identical data field, onto each of the networks. Based on the load and the configuration of said elementary networks, these two frames 32 may arrive at the receiving equipment at different time instants. Here, the case is considered where the two elementary networks work correctly, and therefore the two sent frames 32 arrive at the receiving equipment item 14.

A data frame 32, or a data packet, is defined as a data set sent in a single operation over the communication network 16. The data of each frame 32 are not interpreted. The communication network 16 transports them without knowing their meaning.

Each frame 32 comprises a frame identifier and a data field. The frame identifier is included in network data used to convey the frame 32 to its destination. The data field corresponds to the useful data, which is the "payload" of the frame.

Each frame 32 generally includes a useful data portion and a frame header and footer portion. The frame identifier is then included in the frame header and footer portion, and the data field corresponds to the useful data portion.

In the example of part 7 of standard ARINC 664, the frame identifier is made up of an identifier of the corresponding virtual link, also denoted VL_ID (Virtual Link IDentifier), and a sequence number (SN). The identifier of the corresponding virtual link, or VL_ID, is included in a destination address field, which in turn is included in the frame header and footer portion. The sequence number is a counter for a given virtual link, and is incremented each time a frame 32 is sent having the same virtual link identifier (VL_ID), which makes it possible to distinguish two frames 32 associated with the same virtual link. The sequence number, or SN, is also included in the frame header and footer portion.

Each electronic sending device 18 is configured to send, to the receiving electronic device(s) 20, at least one data frame 32 on each of the elementary networks. Each sending device 18 is configured to be connected to each elementary network.

In the example of FIG. 1, each sending device 18 then includes a sending module 40 configured to send, to the receiving electronic device(s) 20, at least one data frame 32 on a corresponding elementary network, preferably on each of the elementary networks when the communication network 16 is redundant.

Each sending device 18 is for example an avionics device according to part 7 of standard ARINC 664, and the sending module 40 is then configured to send each frame 32 according to a protocol conforming to part 7 of standard ARINC 664.

Each electronic receiving device 20 is configured to receive data, in particular data frames 32, via the asynchronous communication network 16. Each receiving device 20 is configured to be connected to each elementary network.

Each receiving device 20 comprises a receiving module 42 configured to receive several successive data frames 32 via the communication network 16, each frame 32 being sent over the elementary network according to a predefined sending table TAB and with a minimum time gap BAG between the sending time instants of two successive frames 32.

According to the invention, each reception device 20 comprises a verification module 44 configured, for at least two received data frames 32, to estimate a network jitter G from the minimum time gap BAG and reception time instants of at least two frames 32 received on said elementary network, then to compare the estimated jitter G to an authorized range of network jitter values.

Each receiving device 20 is for example an avionics device conforming to part 7 of standard ARINC 664, and the receiving module 42 is then configured to receive each frame 32 according to a protocol conforming to part 7 of standard ARINC 664.

Each network switch 28 is known in itself, and comprises several communication ports, also called connection ports, each communication port being able to be connected to a corresponding electronic equipment item 14.

In the example of FIG. 1, the sending module 40, the receiving module 42 and the verification module 44 are each made in the form of software, or a software component, executable by the processor 26. The memory 24 is then capable of storing sending software configured to send at least one data frame 32 over the corresponding elementary network according to the predefined sending table TAB to other receiving device(s) 20. The memory 24 is also able to store receiving software configured to receive, via the communication network 16, at least one data frame 32 transmitted over said elementary network, and verification software configured, for at least two received data frames 32, to estimate the network jitter G from the minimum time gap BAG and reception time instants of at least two frames 32 received on said elementary network, then to compare the estimated jitter G to the authorized range of network jitter values. The processor 26 of the information processing unit 22 is then able to execute the sending software in the case of the sending device 18, or to execute the receiving software and the verification software in the case of the receiving device 20.

In an alternative that is not shown, the sending module 40, the receiving module 42 and the verification module 44 are each made in the form of a programmable logic component, such as an FPGA (Field Programmable Gate Array), or in the form of a dedicated integrated circuit, such as an ASIC (Applications Specific Integrated Circuit).

Also in a variant, and according to one preferred embodiment, the sending module 40 and the receiving module 42 are each made in the form of software, or a software component, executable by the processor 26; and the verification module 44 is made in the form of a programmable logic component, such as an FPGA.

When the electronic receiving device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 3:
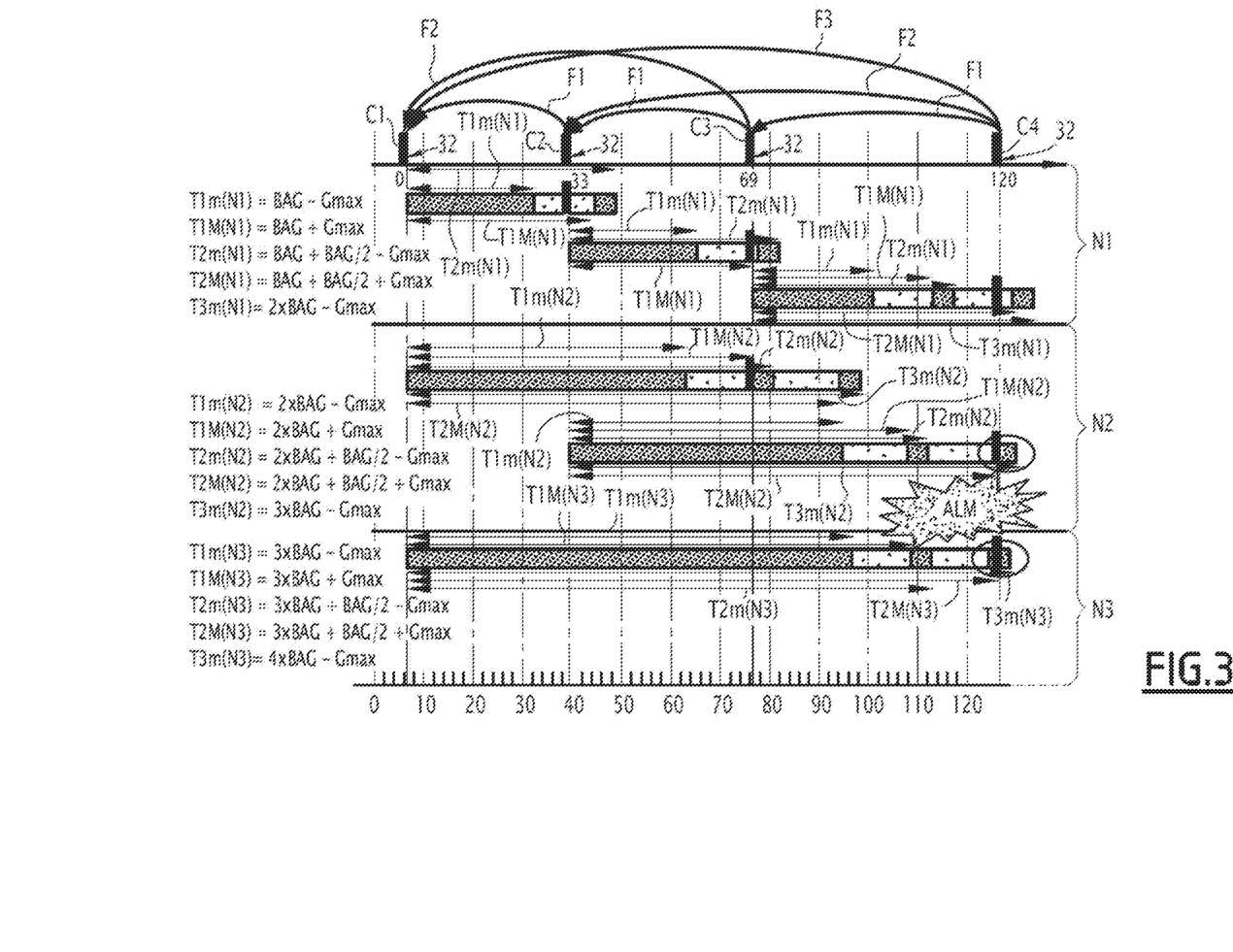
FIG. 3 is a schematic view illustrating the surveillance of the reception of frames, from reception time instants and an estimated network jitter.

The sending module 40 is configured to send each data frame 32 over the corresponding elementary network according to the predefined sending table TAB and with the minimum time gap BAG between the sending time instants of two frames 32, sent successively over said elementary network, as shown in FIG. 3.

Figure 2:
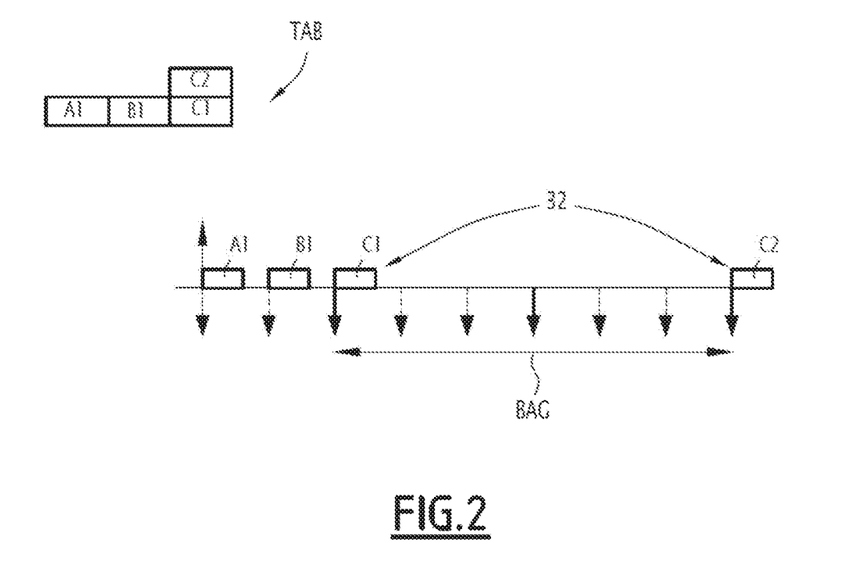
FIG. 2 is a schematic view illustrating the sending of frames according to a predefined sending table over an elementary network of the asynchronous communication network of FIG. 1 and with a minimum time gap between the sending time instants of two successive frames.

In the example of FIG. 2, each frame 32 associated with a first virtual link A is denoted Ak, where k is an integer index incremented from 1. Similarly, each frame 32 associated with a second virtual link B is denoted Bi, and each frame 32 associated with a third virtual link C is denoted Ck. One skilled in the art will then understand that each of the virtual links A, B, C forms an elementary network of said asynchronous communication network 16.

In this example of FIG. 2, the predefined sending table TAB includes a frame A1 for the first virtual link A, a frame B1 for the second virtual link B, and two frames C1, C2 for the third virtual link C, the minimum time gap BAG then being shown between the sending time instants of the two frames C1, C2.

The verification module 44 is able to estimate the network jitter G from the minimum time gap BAG and reception time instants of at least two frames 32 received on said elementary network, to compare the estimated jitter G to the authorized range of network jitter values. As an optional addition, the verification module 44 is able to generate an alert in case of inconsistency of the estimated jitter G, that is to say, when the value of the estimated network jitter G is not comprised in the authorized range of network jitter values.

The verification module 44 is preferably configured to estimate the network jitter G from the duration $\Delta T_R$ separating two reception time instants and a predefined inter-frame time period $\Delta T_T$, the predefined inter-frame time period $\Delta T_T$ being a function of the minimum time gap BAG.

The predefined inter-frame time period $\Delta T_T$ is for example equal to the minimum time gap BAG divided by an oversampling factor K.

The verification module 44 is for example configured to estimate the network jitter G according to the following equation:

$$G = \min\left\{\Delta T_R - E\left(\frac{\Delta T_R}{\Delta T_T}\right)\cdot \Delta T_T;\ \left(E\left(\frac{\Delta T_R}{\Delta T_T}\right)+1\right)\cdot \Delta T_T - \Delta T_R\right\} \quad \text{[Math 1]}$$

where G represents the estimated network jitter;

$\Delta T_R$ represents the duration separating the reception time instants of two frames 32 received on said elementary network by the receiving module 42;

E represents the integer part operator, returning the largest integer less than or equal to the considered number, E(z) i.e., is the largest integer less than or equal to z; and $\Delta T_T$ represents the predefined inter-frame time period, $\Delta T_T$ for example verifying the following equation:

$$\Delta T_T = \frac{BAG}{K} \quad \text{[Math 2]}$$

where BAG represents the minimum time gap between the sending time instants of two successive frames 32; and K represents the oversampling factor.

The minimum time gap is also called BAG (Bandwidth Allocation Gap) and then corresponds to a bandwidth allocation gap.

When the communication network 16 conforms to part 7 of standard ARINC 664, and includes virtual links (VL), this minimum time gap BAG is an important characteristic of the communication network 16, and corresponds to a maximum speed at which the data can be sent, in that it is then guaranteed that they will be sent with this minimum time gap.

In other words, in the case of a communication network 16 that conforms to part 7 of standard ARINC 664, the bandwidth allocated to a virtual link is characterized by the minimum time gap BAG, which defines the minimum time between the beginnings of the sending of two successive frames belonging to a same virtual link. After passing through the communication network 16, two frames that were separated by this minimum time gap BAG can find themselves alongside one another at the receiving device 20.

Furthermore, part 7 of standard ARINC 664 does not define a maximum value of the time gap separating two frames of a same virtual link.

For a set of frames 32 to be sent continuously over a same elementary network, in particular over a same virtual link, frames 32 cannot, however, be sent exactly systematically with a time gap between two successive frames 32 that is equal to this minimum time gap BAG, and the shift can then be observed between a theoretical sending time instant and an observed (or measured) sending time instant, this shift then being called sending jitter. The sending jitter is typically less than 500 ρs.

The minimum time gap BAG is for example substantially equal to 16 ms or 32 ms.

The sending table TAB then makes it possible to control the sending jitter, by defining the sending time instants of successive frames 32 over a same elementary network, in particular over a same virtual link, and by then guaranteeing, by construction, the duration separating two successive sendings of frames 32 over said elementary network.

One skilled in the art will then observe that the sending table TAB also supplies a sending time signature for the communication network 16, which is then used by the verification module 44, in order to detect any anomaly on the communication network 16.

As an optional addition, the verification module 44 is further configured to compare the estimated jitter G for the respective elementary network to the estimated jitter(s) G for the other elementary network(s) of a group of elementary network(s), this group of elementary network(s) corresponding to a data transmission path with at least one network switch 28 in common.

As an optional addition, the verification module 44 is configured to implement an algorithm for managing the redundancy frame by frame on each of the elementary networks, like that disclosed in document FR 2,864,393 B1.

According to this optional addition, the verification module 44 is preferably configured to implement said redundancy management algorithm, before estimating the network jitter G from the minimum time gap BAG and reception time instants of at least two frames 32 received on said elementary network, then to compare the estimated jitter G to the authorized range of network jitter values. In other words, according to this optional addition, the network jitter G is preferably estimated after implementing the redundancy management algorithm.

According to this optional addition, in the exemplary embodiment previously described, where the elementary networks are in the form of virtual links, the verification module 44 is then able to compare the estimated jitter for the respective virtual link to the estimated jitter(s) G for the other virtual link(s) of a group of virtual links, this group of virtual links corresponding to a data transmission path with at least one network switch 28 in common.

The authorized range of network jitter values is for example determined through preliminary learning including the sending of predefined sequences of frames. This preliminary learning preferably includes the sending of normal sequences corresponding to authorized network jitter values and abnormal sequences corresponding to noncompliant network jitter values. Noncompliant network jitter values refer to values outside the authorized range of network jitter values, that is to say, not belonging to said authorized range.

In other words, the authorized range of network jitter values is then determined through a machine learning method.

Among these machine learning methods, those based on a statistical approach, for example the Naïve Bayes method, appear to be more particularly suited to characterizing the network jitter from the receiving device 20. In this case, a first supervised learning phase with labeling will be established with data specifically defined and labeled for the learning. First, this supervised learning will make it possible to develop the network jitter model, then the latter will be embedded in the receiving device 20 to be used operationally in order to detect the abnormal behaviors.

Also among these machine learning methods, the impact of data from different virtual links, but circulating over common physical routes, can be characterized by unsupervised learning methods, such as a cluster k-means method, which performs a classification of the exchanged data as a function of the value of a distance, the distance here being chosen to be characteristic of an actual route, that is to say, of the impact of the network jitter of the actual route common to the data frames 32.

In a variant or additionally, the authorized range of network jitter values is determined through a static analysis of the network 16 and the predefined sending table TAB.

As an optional addition, the authorized range of network jitter values depends on an operating phase in which the aircraft 10 is found on which the electronic receiving device 20 is configured to be embedded. Indeed, the bandwidth of the communication network 16 depends on the operating phase of the aircraft 10, and the network jitter G will then also vary as a function of the operating phase of the aircraft 10. As an example, a first authorized range of network jitter values is associated with the ground phase of the aircraft 10, and a second authorized range of network jitter values is associated with the flight phases of the aircraft 10. Said second range preferably includes values greater than those of said first range. This then makes it possible to account for the difference in traffic between the flight and ground phases. On the ground, the network jitter G is lower, since all of the equipment items of the aircraft 10 are not operational.

Additionally, the predefined inter-frame time period $\Delta T_T$ is preferably greater than twice the maximum value $G_{max}$ of the authorized range of network jitter values.

Figure 4:
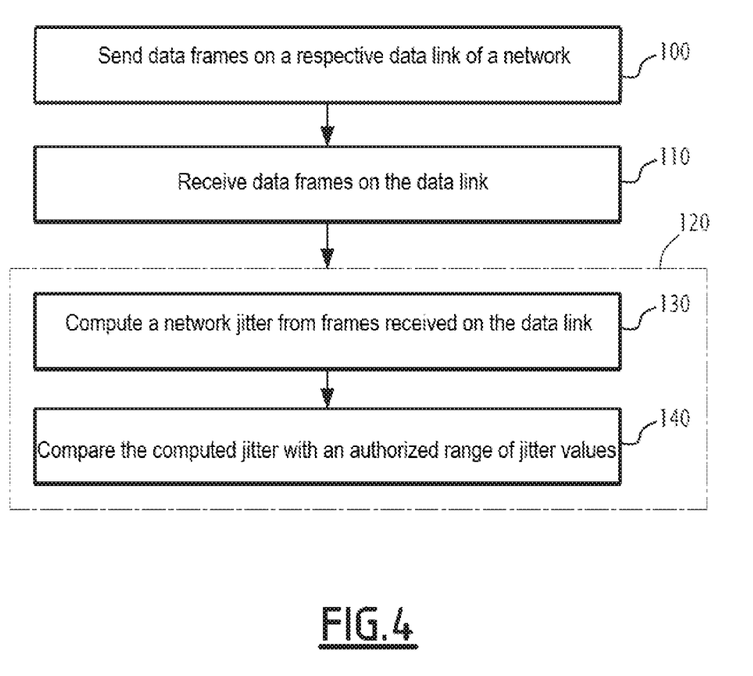
FIG. 4 is a flowchart of a data transmission method within the communication system of FIG. 1.

The operation of the communication system 12 according to the invention will now be explained using FIG. 4, showing a flowchart of the data transmission method within the communication system 12 from a sending device 18 to receiving device(s) 20 via the asynchronous communication network 16.

During an initial step 100, the sending device 18 sends, via its sending module 40 and to receiving device(s) 20, several data frames 32 on a respective elementary network of the asynchronous communication device 16. The respective elementary network forms a data link for the transmission of said frames 32, and for example corresponds to a virtual link when the communication network 16 conforms to part 7 of standard ARINC 664.

During step 110, each receiving device 20 receives, on said elementary network, that is to say, on said data link, of the asynchronous communication network 16 and via its receiving module 42, the sent data frames 32.

Each recipient receiving device 20 having received several frames 32 then verifies, during the following step 120 and via its verification module 44, that the value of the network jitter estimated from these received frames 32 is coherent, and generates an alarm signal if not.

The verification step 120 then includes a sub-step 130 during which the verification module 44 estimates the network jitter G from the minimum time gap BAG and reception time instants of the frames 32 received on said elementary network.

The verification step 120 next comprises a sub-step 140 during which the verification module 44 compares the estimated network jitter G to the authorized range of network jitter values. An alert is generated by the verification module 44 in case of inconsistency detected during this comparison, that is to say, if the estimated value of the network jitter G is outside the authorized range of network jitter values.

FIG. 3 then illustrates a verification that the network jitter G does not exceed the maximum value $G_{max}$ of the authorized range of network jitter values, by calculating authorized successive reception time ranges of a following frame 32 from the reception time instant of a previous frame 32, for different evaluation levels.

When the evaluation of the network jitter G in light of the maximum network jitter value $G_{max}$ is done on two frames 32 received successively, that is to say, between a previous frame with identifier N and a following frame with identifier N+1, for example based on the reception time instants of the frames C1 and C2, or frames C2 and C3, or frames C3 and C4 in FIG. 3, the evaluation is said to be level 1, also denoted N1. Similarly, when this evaluation is done between a previous frame with identifier N and a following frame with identifier N+2, for example based on the reception time instants of the frames C1 and C3, or frames C2 and C4 in FIG. 3, the evaluation is said to be level 2, also denoted N2. Similarly, when this evaluation is done between a previous frame with identifier N and a following frame with identifier N+3, for example based on the reception time instants of the frames C1 and C4 in FIG. 3, the evaluation is said to be level 3, also denoted N3, and so forth.

For each evaluation level Ni, the successive authorized receiving time ranges for the following frame 32 are then defined by minimum durations $T_jm(N_i)$ and maximum durations $T_jM(N_i)$ from the reception time instant of the preceding frame 32, where i is an integer index greater than or equal to 1, associated with the evaluation level; and j is an integer index greater than or equal to 1 and incremented by 1 upon each new authorized successive time range. In other words and as an example, for evaluation level 1, denoted N1, the first authorized time range is between the minimum $T_1m(N1)$ and maximum $T_1M(N1)$ durations, the second authorized time range is between the minimum $T_2m(N1)$ and maximum $T_2M(N1)$ durations, and so forth, from the reception time instant of the preceding frame 32. Similarly, for evaluation level 2, denoted N2, the first authorized time range is between the minimum $T_1m(N2)$ and maximum $T_1M(N2)$ durations, the second authorized time range is between the minimum $T_2m(N2)$ and maximum $T_2M(N2)$ durations, and so forth, from the reception time instant of the frame 32 previously received.

The minimum $T_jm(N_i)$ and maximum $T_jM(N_i)$ durations for example verify the following equations:

$$T_jm(N_i) = i \cdot BAG + (j-1) \cdot \Delta T_T - G_{max} \quad [\text{Math 3}]$$

$$T_jM(N_i) = i \cdot BAG + (j-1) \cdot \Delta T_T + G_{max} \quad [\text{Math 4}]$$

where i represents the integer index of the evaluation level, $i \geq 1$;

j represents the integer index of the authorized reception time range, $j \geq 1$;

BAG represents the minimum time gap between the sending time instants of two successive frames 32;

$\Delta T_T$ represents the predefined inter-frame time period, previously defined and for example verifying the equation (Math2); and $G_{max}$ represents the maximum value of the authorized range of network jitter values.

Following this verification of the network jitter G relative to the maximum value $G_{max}$ of the authorized range of network jitter values, which [sic] the verification module 44 then triggers an alarm, denoted ALM, when the reception time instant of a following frame 32 is outside an authorized respective reception time range from the reception time instant of a previous frame 32.

In the example of FIG. 3, an alarm ALM is then triggered in the case of the frame C4 received after the maximum duration $T_2M(N2)$, and before the next minimum duration $T_3m(N2)$, as of the time instant of reception of the frame C2 for this level evaluation N2. An alarm ALM is also triggered in the case of the frame C4 received after the maximum duration $T_2M(N3)$, and before the next minimum duration $T_3m(N3)$, as of the time instant of reception of the frame C1 for this level evaluation N3.

Thus, the electronic receiving device 20 according to the invention makes it possible to estimate the network jitter G from the minimum time gap BAG and the reception time instants of the frames, then to compare the estimated network jitter G to the authorized range of network jitter values, in order to detect an abnormal value of the network jitter G.

This surveillance of the network jitter G then makes it possible to detect any attack on the communication network 16 simply and directly, at the electronic receiving device 20, without having to use information sent by third-party equipment items, which would also potentially be compromised.

The detection of an abnormal jitter value makes it easier to detect a replacement of an equipment item connected to the network with malicious equipment. Indeed, in the case of such a replacement, the network jitter is difficult for the malicious equipment item to control, and an abnormal value following this replacement will then be detected by the receiving device 20.

Likewise, in the case of the replacement of a network switch by a malicious switch, the network jitter will also be difficult for the malicious switch to control, and an abnormal value following this replacement will then be detected by the receiving device 20. It should also be noted that a nil value of the network jitter, which can also be synonymous with the total absence of traffic, other than that of the surveilled elementary network, on the communication network will also typically be detected by the receiving device 20, then being less than the minimum value of the authorized range of network jitter values. Such a detection is also desired because a total absence of traffic is suspicious.

Also similarly, a cyber-attack causing increased use of the communication network 16 will affect the jitter of the surveilled network, and will then be detectable by the electronic receiving device 20 according to the invention.

The receiving device 20 then makes it possible to detect different types of malicious attacks, like those cited above, in particular cyber-attacks, and in general makes it possible to improve the surveillance of the communication network 16.

The invention claimed is:

1. An electronic receiving device for receiving data via an asynchronous communication network including at least one elementary network, the electronic device being configured to be connected to said elementary network and comprising:
   a receiver configured to receive several successive data frames via the asynchronous communication network, each frame being sent over said elementary network according to a predefined sending table and with a minimum time gap between sending time instants of two successive frames, a verifier configured, for at least two received data frames, to estimate a network jitter from the minimum time gap and reception time instants of at least two frames received on said elementary network, then to compare the estimated network jitter to an authorized range of network jitter values, wherein the verifier is configured to estimate the network jitter from a duration separating two reception time instants and from a predefined inter-frame time period, the predefined inter-frame time period being a function of the minimum time gap, and wherein the predefined inter-frame time period is equal to the minimum time gap divided by an oversampling factor.

2. The device according to claim 1, wherein the authorized range of network jitter values is determined through preliminary learning including a sending of predefined sequence(s) of frame(s).

3. The device according to claim 2, wherein the sending of normal sequences corresponds to authorized network jitter values and abnormal sequences corresponding to non-compliant network jitter values.

4. The device according to claim 1, wherein the authorized range of network jitter values is determined through a static analysis of the network.

5. The device according to claim 1, wherein the authorized range of network jitter values depends on an operating phase in which an aircraft is found, aircraft on which the electronic receiving device is configured to be embedded.

6. The device according to claim 1, wherein the verifier is further configured to compare the estimated network jitter for the respective elementary network to the estimated network jitter(s) for the other elementary network(s) of a group of elementary network(s), this group of elementary network(s) corresponding to a data transmission path with at least one network switch in common.

7. The device according to claim 1, wherein the device is an avionics device according to part 7 of standard ARINC 664, and the receiver is configured to receive each frame according to a protocol compliant with part 7 of standard ARINC 664.

8. An electronic data communication system including an electronic sending device and an electronic receiving device connected to one another by an asynchronous communication network, the asynchronous communication network including at least one elementary network,
the electronic sending device being configured to send, to the electronic receiving device, several successive data frames on said elementary network,
wherein the electronic receiving device is according to claim 1.

9. An electronic receiving device for receiving data via an asynchronous communication network including at least one elementary network, the electronic device being configured to be connected to said elementary network and comprising:
a receiver configured to receive several successive data frames via the asynchronous communication network, each frame being sent over said elementary network according to a predefined sending table and with a minimum time gap between sending time instants of two successive frames,
a verifier configured, for at least two received data frames, to estimate a network jitter from the minimum time gap and reception time instants of at least two frames received on said elementary network, then to compare the estimated network jitter to an authorized range of network jitter values, wherein the verifier is configured to estimate the network jitter from a duration separating two reception time instants and from a predefined inter-frame time period, the predefined inter-frame time period being a function of the minimum time gap, and wherein the predefined inter-frame time period is greater than twice a maximum value of the authorized range of network jitter values.

10. The device according to claim 9, wherein the authorized range of network jitter values is determined through preliminary learning including a sending of predefined sequence(s) of frame(s).

11. The device according to claim 10, wherein the sending of normal sequences corresponds to authorized network jitter values and abnormal sequences corresponding to non-compliant network jitter values.

12. The device according to claim 9, wherein the authorized range of network jitter values is determined through a static analysis of the network.

13. The device according to claim 9, wherein the authorized range of network jitter values depends on an operating phase in which an aircraft is found, aircraft on which the electronic receiving device is configured to be embedded.

14. The device according to claim 9, wherein the verifier is further configured to compare the estimated network jitter for the respective elementary network to the estimated network jitter(s) for the other elementary network(s) of a group of elementary network(s), this group of elementary network(s) corresponding to a data transmission path with at least one network switch in common.

15. The device according to claim 9, wherein the device is an avionics device according to part 7 of standard ARINC 664, and the receiver is configured to receive each frame according to a protocol compliant with part 7 of standard ARINC 664.

16. An electronic data communication system including an electronic sending device and an electronic receiving device connected to one another by an asynchronous communication network, the asynchronous communication network including at least one elementary network,
the electronic sending device being configured to send, to the electronic receiving device, several successive data frames on said elementary network,
wherein the electronic receiving device is according to claim 9.

17. A method for receiving data via an asynchronous communication network including at least one elementary network, the method being carried out by an electronic receiving device connected to said elementary network, and comprising:
receiving several successive data frames via the asynchronous communication network, each frame being sent over the elementary network and according to a predefined sending table and with a minimum time gap between sending time instants of two successive frames,
verifying at least two received data frames, said verifying including an estimate of a network jitter from the minimum time gap and reception time instants of at least two frames received on said elementary network, then a comparison of the estimated network jitter to an authorized range of network jitter values, wherein the verifying further includes to estimate the network jitter from a duration separating two reception time instants and from a predefined inter-frame time period, the predefined inter-frame time period being a function of the minimum time gap, and wherein the predefined inter-frame time period is equal to the minimum time gap divided by an oversampling factor.

18. A non-transitory computer-readable medium including a computer program comprising software instructions which, when executed by a computer, carry out a method according to claim 17.

19. A method for receiving data via an asynchronous communication network including at least one elementary network, the method being carried out by an electronic receiving device connected to said elementary network, and comprising:

receiving several successive data frames via the asynchronous communication network, each frame being sent over the elementary network and according to a predefined sending table and with a minimum time gap between sending time instants of two successive frames, verifying at least two received data frames, said verifying including an estimate of a network jitter from the minimum time gap and reception time instants of at least two frames received on said elementary network, then a comparison of the estimated network jitter to an authorized range of network jitter values, wherein the verifying further includes to estimate the network jitter from a duration separating two reception time instants and from a predefined inter-frame time period, the predefined inter-frame time period being a function of the minimum time gap, and wherein the predefined inter-frame time period is greater than twice a maximum value of the authorized range of network jitter values.

20. A non-transitory computer-readable medium including a computer program comprising software instructions which, when executed by a computer, carry out a method according to claim 19.

* * * * *